United States Patent [19]
Robinson

[11] Patent Number: 5,228,781
[45] Date of Patent: Jul. 20, 1993

[54] THERMOMETER

[75] Inventor: Max C. Robinson, Cumaná, Venezuela

[73] Assignee: La Corporation de l'Ecole Polytechnique, Montreal, Canada

[21] Appl. No.: 878,351

[22] Filed: May 4, 1992

[51] Int. Cl.⁵ .......................... G01K 7/16; G01K 7/34
[52] U.S. Cl. .................................... 374/183; 374/184; 338/25; 338/28
[58] Field of Search ................ 374/183, 184; 361/282; 338/25, 28

[56] References Cited

U.S. PATENT DOCUMENTS

| | | |
|---|---|---|
| 3,683,696 | 8/1972 | Vaughan et al. .............. 374/180 |
| 3,754,442 | 8/1973 | Arnett . |
| 3,759,104 | 9/1973 | Robinson . |
| 4,095,469 | 6/1978 | Yamada et al. . |
| 4,480,312 | 10/1984 | Wingate .......................... 374/170 |
| 4,847,794 | 7/1989 | Hrubes ............................. 374/172 |
| 5,085,526 | 2/1992 | Sawtell et al. ................. 374/183 |

Primary Examiner—William A. Cuchlinski, Jr.
Assistant Examiner—Diego F. F. Gutierrez
Attorney, Agent, or Firm—Chilton, Alix & Van Kirk

[57] ABSTRACT

The thermometer consists of an operational amplifier ratio bridge which is made up of at least one arm having a 3-terminal high impedance temperature sensor one of whose leads being connected to the output of an operational amplifier whose gain has been stabilized and whose output impedance has been rendered negligible by negative feedback. The other lead being connected to the input of an operational amplifier whose gain has been stabilized and whose input impedance has been rendered negligible by negative feedback. Standard arms, comprising standard resistors and capacitors and operational amplifiers whose gain has been stabilized by negative feedback may be connected in parallel with the first arm. A voltage source is connected to the input of the parallel arrangement and a meter measures the output of the parallel arrangement which may be partially or completely balanced by adjusting the values of the standard capacitors and/or resistors and/or by adjusting the relative gainss of the operational amplifiers. The temperature of the 3-terminal high impedance center is calculated from the ratio of output to input voltage measured by the meter and the values of the standard capacitors and resistors and from the relative gain of the operational amplifiers. The operational amplifier ratio bridge may be combined with a transformer bridge.

11 Claims, 7 Drawing Sheets

THERMOMETER

BACKGROUND OF INVENTION

1. Field of the Invention

The invention relates to a thermometer which includes a 3-terminal high impedance temperature sensitive element. More specifically, the invention relates to such a thermometer which also includes an operational amplifier ratio bridge analogous to a transformer bridge or a hybrid transformer-operational amplifier ratio bridge. In the inventive thermometer, the direct impedance of the 3-terminal high impedance sensor is measured with the operational amplifier ratio bridge or the hybrid transformer-operational amplifier ratio bridge in such a manner that the resistance of the leads and the stray impedances associated with the sensor and its leads do not significantly influence the repeatability and accuracy of the measurement.

2. Description of Prior Art

The use of 3-terminal capacitors as temperature sensitive elements in thermometers has been taught in U.S. Pat. No. 3,759,104, Sep. 18, 1973, Canadian Patent 914,449, Nov. 14, 1972 and British Patent 1,260,730, May 27, 1972 all of which were issued to the inventor herein, and all of which are corresponding patents.

Also known in the art are U.S. Pat. Nos. 3,754,442, Arnett, Aug. 28, 1973 and 4,095,469, Yamada et al, Jun. 20, 1978.

The '469 patent discloses such a thermometer for a temperature measuring apparatus which uses a detecting coil which is placed in a metallic body in which the temperature is to be measured in order to provide an impedance change to measure the temperature of the metallic body. An oscillator is also used in the circuitry of the '469 patent.

The '442 patent describes a temperature measuring and indicating system which provides an output signal which is a linear function of the temperature sensed by a resistive sensing element which is excited by operational amplifiers. A current generator induces a signal in the resistance sensor element which is proportional to the difference between a given reference temperature and the temperature sensed.

It should be noted that the third terminal of a 3-terminal capacitor refers to the electric shield which surrounds the other two electrodes thereby fixing the direct impedance between these first two electrodes. The term, 3-terminal capacitor, also implies that the leads to the first two electrodes are shielded from each other which is normally achieved by extending the shield to surround at least one, but usually, both of their leads. Moreover, from an experimental point of view, a shielded capacitor can be considered to be a 3-terminal capacitor only when connected in special circuits such as transformer bridges in such a manner that the stray capacitances of the first two electrodes and their leads do not affect to any significant extent the measurement of the direct capacitance. For example, a transformer bridge can be used to measure the direct capacitance of, say, 10 pF of a 3-terminal capacitor with a precision of one part per million, or better, in the presence of stray capacitances greater than 100 pF. On the other hand, such a capacitor becomes, in effect, a two terminal component if placed in a typical measuring circuit such as a Wheatstone bridge or when combined with an inductor to produce a resonance circuit. Under such conditions, the direct and stray capacitances appear in parallel so that the direct capacitance, if small, is swamped by the usually much larger stray capacitances.

The concepts of 3-terminal capacitors and transformer bridges are explained in considerable detail in the book authored by B. Hauge and T.R. Foord entitled "Alternating Current Bridge Methods" published by Pitman Publishing Corporation (N.Y.) in 1971. In the following discussion, the term, transformer bridge, will be used to include those bridges often referred to as inductive bridges, transformer ratio bridges, and current bridges, and will also include any other similar bridge based on the properties of inductively coupled ratio arms.

Some of the advantages of 3-terminal capacitance (3TC) thermometers are:

i. The physical size of the sensor can be made very small ii. By a proper choice of the capacitor dielectric and the insulators and conductors for the leads, shielding, and electrodes, sensors can be constructed to cover the range from less than 0.1 K to approximately 2000° C. even in hostile environments.

iii. The internal dissipation of the sensor can be rendered negligible.

iv. A precision (repeatability) of better than 0.01° C. can be achieved over a wide temperature range. If desired, this precision can be increased to $10^{-6}$° C. over a temperature range of a few degrees.

v. The sensor is not normally affected to any appreciable extent by direct electric and magnetic fields nor by alternating electromagnetic fields.

vi. Within wide limits, the accuracy of the thermometer is not appreciably affected by the electric resistance of the leads connecting the sensor to the transformer bridge and detector, nor by the capacitive reactance and the conductance between the leads and their shield.

vii. The thermometer is unaffected by thermal electromotive forces in the leads, transformer bridge, and detector.

It is believed that no other type of thermometer has all the above advantages.

However the 3TC thermometer suffers from the following disadvantages:

i. The transformer bridge normally used to measure the capacitance and dissipation of the sensor is bulky, heavy and expensive.

ii. In the case of remote sensing, where the shielded leads connecting the sensor to the bridge and detector are tens and hundreds of meters in length, the small reactance of the stray capacitance between the central conductor and its shield can exceed the limits mentioned in point vi. above and can overload the transformer and short circuit the detector input thereby reducing both the accuracy and sensitivity of the device. Additional error can be introduced by the phase shift and attenuation caused by the capacitive reactance of the shielded leads shunting the resistance of these same leads. Although the reactance of the stray capacitance of the shielded leads can be increased by reducing the frequency of the oscillator activating the transformer bridge, other experimental problems arise when the frequency is reduced below a certain limit, say, at 10 Hz.

iii. Even with the most refractory dielectrics, the dissipation of a 3-terminal capacitive sensor increases at sufficiently high temperatures to such an extent that the component can be considered to be a 3-terminal resistor rather than a 3-terminal capacitor.

With respect to the use of terms, it should be noted that no substance is a perfect insulator. Above OK, any so called insulator or dielectric conducts to a certain extent, the conductance often increasing as an approximately exponential function of the temperature. If the conductance is primarily electronic in character, then, above a somewhat arbitrarily defined temperature, a dielectric is usually referred to as a semiconductor. For example, pure germanium and silicon are very good insulators at cryogenic temperatures but are considered to be semiconductors at room temperature. On the other hand, if the conductance is primarily ionic in character, a material is normally considered to be an ionic conductor above a vaguely defined temperature which depends on the frequency of the alternating electric current; and a dielectric below this temperature. In this patent, the terms dielectric and insulator are taken to be synonymous.

With respect to the terms, capacitor and resistor, it should be noted that a real, linear, and passive electric component can be represented mathematically as a combination in parallel and/or in series of at least one ideal resistor, one ideal capacitor, and one ideal inductor. This mathematical representation is not unique and one or another may be chosen as a matter of convenience. In this invention, it has been found convenient to represent each passive component as a parallel combination of an ideal resistor and an ideal capacitor whose values vary with temperature and, to a lesser extent, with frequency. At the frequencies at which the measuring apparatus operates, the inductive contribution to the impedance of the sensor and other passive components used in this invention can be ignored without introducing any significant error.

If, in the parallel representation, the magnitude of the capacitive susceptance is much greater than the conductance, the component is referred to as a capacitor; if the conductance is much larger than the magnitude of the susceptance, the component is referred to as a resistor. In this invention, a component whose susceptance and conductance are approximately equal in magnitude is referred to as a resistor-capacitor. In addition, the term impedor will refer to any component that may be represented by an ideal resistor and an ideal capacitor in parallel; that is, an impedor will signify an almost ideal resistor, an almost ideal capacitor, or a resistor-capacitor.

As in the case of a 3-terminal capacitor, the shield of a 3-terminal impedor fixes the direct impedance between the first two electrodes. Furthermore, from an experimental point of view, a shielded impedor can be considered to be a 3-terminal impedor only when connected in special circuits such as transformer bridges in such a manner that the stray impedances of the electrodes and their leads do not affect in any significant manner the measurement of the direct impedance even when the former are very much smaller than the latter. Otherwise, a shielded impedor becomes, in effect, a 2-terminal component.

DISCLOSURE OF THE INVENTION

To overcome the disadvantages of the 3TC thermometer, the transformer bridge is replaced in this invention either by an electronic analogue of a transformer bridge, to be referred to as an operational amplifier ratio (OAR) bridge, in which one or more operational amplifiers replace the ratio transformer, or else by a hybrid transformer-operational amplifier ratio (TOAR) bridge. The sensing element is a 3-terminal impedor whose impedance is much greater in magnitude than the resistance of the leads connecting the sensor to the other elements of the bridge. Depending on the dimensions and composition of the leads, the minimum magnitude of the sensor impedance is normally about 10 k$\Omega$ while the maximum is more than $10^4$ M$\Omega$. In those cases where the resistance of the leads is, say, less than 0.1$\Omega$ or where an accuracy of, say, $\pm 1°$ C. is acceptable, the minimum impedance of the sensor can be reduced to about 1 k $\Omega$ or even less; although in practice, there seldom would be any need or advantage in using a sensor with such relatively low impedance. The bridge may be totally or partially balanced or may be left completely unbalanced.

Using well known techniques, the detector of the bridge can be modified to measure the capacitance or the resistance of the sensor or both these quantities. Depending upon the sensor and the temperature range, either the resistance or the capacitance can then be converted to temperature using elementary computational circuits well known to those skilled in the art. Of course, the impedance of the sensor can be converted to temperature with the aid of graphs, charts, or tables although, with present day technology, such cumbersome methods are rarely necessary.

As is well known to those skilled in the art, it is often convenient to use two meters so that both the resistance and capacitance can be measured simultaneously. In those cases where both the capacitance and the resistance of the sensor are sensitive functions of the temperature, it is advantageous to measure both these quantities and convert them to temperature. A disagreement between the two simultaneous temperature readings would indicate a malfunction of the OAR bridge or an incorrect conversion of either the resistance or capacitance of the sensor to temperature.

The thermometer of this invention will be referred to as a 3-terminal high impedance (3THI) thermometer and can be considered to be a generalization of, and improvement upon, the concept of a 3TC thermometer. A 3THI thermometer retains all of the favorable features of a 3TC thermometer but has the following additional advantages:

1. A 3THI thermometer, based on the accurate measurement by means of an OAR bridge of the temperature sensitive impedance of a high impedance sensor, can be significantly more portable and economic than a 3TC thermometer, which uses a transformer bridge to measure the direct capacitance of the sensor. Using commercially available components, the measuring apparatus can be reduced in size and weight to about those of hand held (pocket) calculators. Using well known microelectronic techniques, the size and weight can be reduced still further by combining the discrete amplifiers and resistors.

If greater accuracy is required than that readily obtainable with an OAR bridge, a TOAR bridge can be used in which coupled inductor ratio arms are utilized to determine the first one or two significant figures while operational amplifiers provide the following three or four less significant figures. While a TOAR bridge is somewhat larger and more expensive than an OAR bridge, it can still be significantly smaller and more economic than currently available transformer bridges of comparable accuracy. As a result, 3THI sensors with a temperature coefficient of only a few hundred parts per million per ° C., can be used in combination with a TOAR bridge, to measure temperature with a precision of ±0.° C. or better.

2. The shielded leads of the 3THI sensor can be hundreds of meters in length without significantly reducing the precision and accuracy of the thermometer inasmuch as an OAR bridge can, in principle, be operated at arbitrarily low frequencies.

3 The use, in addition to 3-terminal capacitors, of 3-terminal high impedance resistor-capacitors and resistors as sensors permits a greater flexibility in design and a greater choice of materials in the construction of the sensors. In addition to insulators, the suitable sensing materials include ionic conductors, semiconductors, and, at high temperatures, refractory metals such as tungsten, molybdenum, niobium, tantalum their alloys.

The thermometer of this invention differs from the common 2-terminal resistance and thermistor thermometers in that 2-terminal resistance thermometers usually have a resistance of tens or hundreds of ohms and thermistor sensors normally have a resistance between $10\Omega$ and $100 \text{ k}\Omega$. Among the factors limiting the maximum resistance of 2-terminal resistance and thermistor sensors is the resistance of the insulation which appears in parallel with that of the sensor. Since this limitation is effectively absent in the case of the 3THI sensors of this invention, their impedance can be greater than $10^4 \text{ M}\Omega$.

In the case of the usual 2-terminal resistance and thermistor thermometers, the resistance of the leads often complicates the measurement of the resistance of the sensor thereby limiting the accuracy and precision unless elaborate precautions are taken. In the case of 3THI thermometers, the impedance of the sensor is sufficiently large that the resistance of the leads is normally a negligible source of error.

In fact, it becomes convenient in certain cases, such as in cryogenic applications, to use resistance wires as leads to 3THI sensors thereby increasing the thermal resistance of the leads and reducing the error caused by heat flowing to or from the sensor through the leads. Also, as noted previously, the leads of a 3THI sensor can be hundreds of meters long thereby facilitating remote sensing of temperature without complicating the measuring process or introducing appreciable error. The use of such high resistance leads in conventional resistance thermometry would appear to make the measurement process very difficult and greatly reduce the accuracy.

3THI thermometry effectively eliminates the problems of self heating and thermal instability that often occur in conventional 2-terminal resistance and thermistor thermometry. The dissipation of a resistance or thermistor thermometer is equal to $V^2/R$ where V is the potential drop across the sensor and R is the resistance. This dissipation increases the temperature of the sensor which, in many applications, can result in considerable experimental error. If the sensor is a thermistor, then the increase in temperature lowers the resistance of the sensor which increases still further the dissipation thereby increasing still further the temperature and decreasing still further the resistance, etc. As is well known, this positive feedback may lead to instability and, in some cases, to the destruction of the sensor.

The dissipation of a 3THI thermometer is equal to $V^2\cos\phi/|Z|$ where $\phi$ is the phase angle by which the current leads the voltage and $|Z|$ is the absolute value of the impedance of the sensor. At the relatively low temperatures where self heating may be a significant problem, $|Z|$ is usually greater than 10 M$\Omega$ and cos $\phi$ is normally less than 0.01. Thus for the same operating voltage and in a temperature range up to a few hundred degrees Celsius, the self heating of a 3THI sensor is typically less than $10^{-4}$ of the self heating of a conventional resistance or thermistor thermometer.

SUMMARY OF INVENTION

In accordance with a particular embodiment of the invention there is provided a thermometer comprising:

an operational amplifier ratio bridge including;

at least one arm, said arm including;

a high impedance 3-terminal impedor being either a 3-terminal capacitor or a 3-terminal resistor or a 3-terminal resistor-capacitor including a first and second electrode each electrode having a lead, said leads being shielded from each other, a temperature sensitive material interposed between said first and second electrodes, a third shielding electrode having a lead, said third electrode being insulated from said first and second electrodes and said leads, said third electrode surrounding and shielding said first and second electrodes and the interposed material for fixing the direct impedance between said first and second electrodes so that said direct impedance varies with temperature as a well defined function thereof, the magnitude of said direct impedance being sufficiently great that the resistance of said leads can be considered to be negligibly small, said 3-terminal impedor comprising the sensing element of said thermometer;

a first operational amplifier whose gain has been accurately determined and stabilized by negative feedback and whose output is connected to said lead of said first electrode of said 3-terminal impedor, the output impedance of said first operational amplifier being reduced by said negative feedback so as to be negligibly small compared to the magnitude of said direct impedance of said 3-terminal impedor and compared to the magnitude of the stray impedances of said first electrode and said lead;

a voltage source providing a voltage of known and stable frequency to the input of said first operational amplifier, said frequency being sufficiently low so that the resistances of said leads of said first and second electrodes become negligibly small compared with the magnitude of the stray capacitive reactances of said leads;

a detecting operational amplifier whose gain has been accurately determined and stabilized by negative feedback and whose inverting input is connected to said lead of said second electrode of said 3-terminal impedor, the input impedance of said detecting operational amplifier being reduced by said negative feedback so as to be negligibly small compared to the magnitude of said direct impedance and compared to the magnitude of the stray impedances of said second electrode and of said lead of said second electrode;

a meter for measuring the real part or the imaginary part or the absolute value of the ratio of the amplitude of the output voltage of said detecting operational amplifier to the amplitude of the voltage signal of said voltage source such that moderate changes in the magnitude of said voltage signal do not significantly change the result of said measurement;

wherein, the temperature which determines the direct impedance of said 3-terminal impedor is calculated from the measured values of said parts of said ratio of said amplitudes.

BRIEF DESCRIPTION OF DRAWINGS

The invention will be better understood by an examination of the following disclosure, together with the accompanying drawings, in which.

DESCRIPTION OF PREFERRED EMBODIMENTS

Figure 1A:
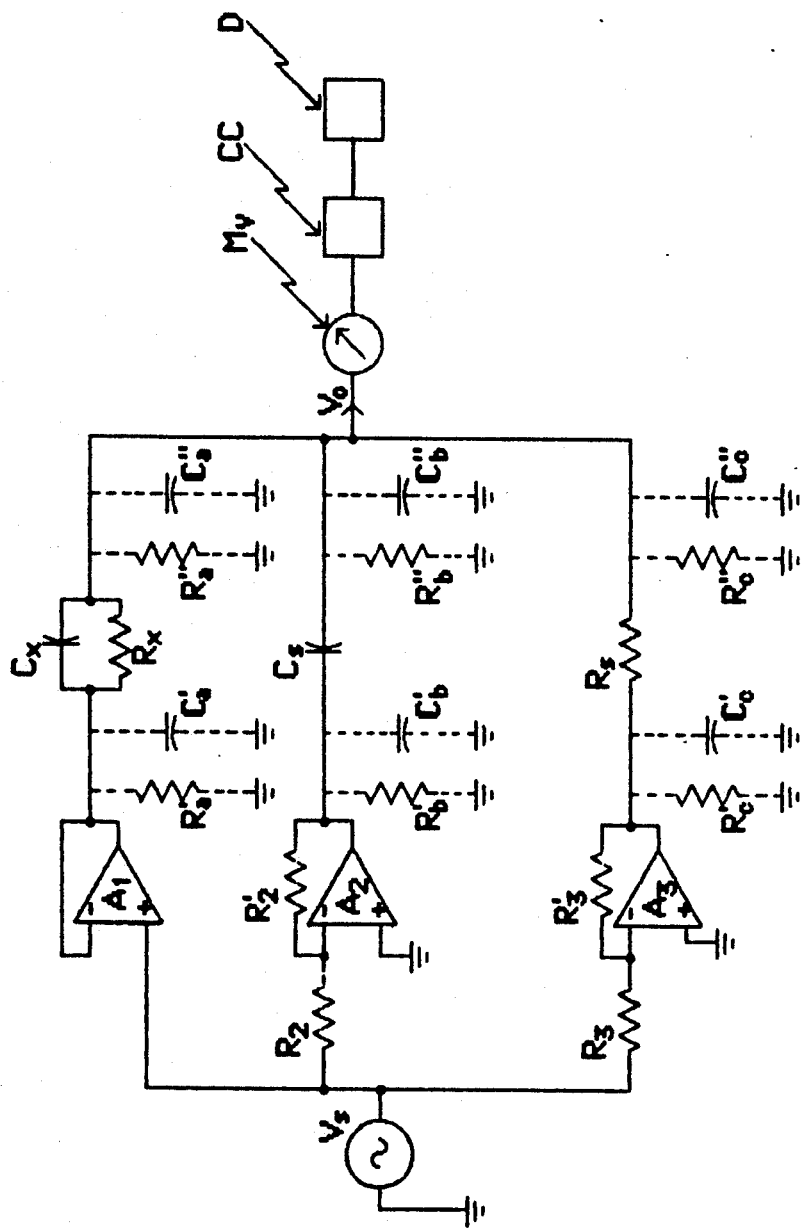
FIG. 1A illustrates a 3THI thermometer with a basic OAR bridge with 3 arms.

FIG. 1A illustrates a 3THI thermometer which uses the basic OAR bridge with three arms. The first arm comprises an operational amplifier $A_1$ whose output is connected to a 3-terminal impedor whose equivalent circuit is represented by an ideal resistor $R_x$ and an ideal capacitor $C_x$ in parallel. Although not specifically so illustrated in FIG. 1, it is to be understood that the 3-terminal impedor includes an electric shield which surrounds the impedor and at least one, but usually both, of its leads.

$C_a'$, $C_a''$, $R_a'$ and $R_a''$ are the stray capacitances and resistances associated with this 3-terminal impedor and its leads.

The second arm consists of a resistor $R_2$, connected to the inverting input of an operational amplifier $A_2$, having a feedback resistor $R_2'$, and a 3-terminal standard capacitor $C_s$. Once again, the 3-terminal capacitor, as above-described, has an electric shield which surrounds the two electrodes and, normally, at least one of its leads as illustrated as illustrated in my U.S. Pat. Nos. 3,727,117 and 3,759,104.

The third arm consists of a resistor $R_3$, connected to the inverting input of an operational amplifier $A_3$ having a feedback element $R_3'$. The output of the operational amplifier is connected to a 3-terminal standard resistor, $R_s$. The resistor $R_s$ includes an electric shield which surrounds the two electrodes of the resistor as above-described.

For the sake of simplicity and clarity, $C_s$ and $R_s$ are shown as fixed standards in FIG. 1A and in the following circuit diagrams. However, it is common practice to use banks of more than one standard component some of which may be variable. Also, as will be discussed below, a 2-terminal standard capacitor and/or a 2-terminal standard resistor can, under certain conditions, take the place of the 3-terminal components without introducing significant error.

$C_b'$, $C_b''$, $R_b'$ and $R_b''$ are the stray capacitances and resistances associated with $C_s$ and its leads, while $C_c'$, $C_c''$, $R_c'$ and $R_c''$ are the stray capacitances and resistances associated with $R_s$ and its leads.

As can be seen, the three arms are connected in parallel. The 3-terminal impedor constitutes the temperature sensitive element in that the impedance of this element varies with temperature. The relative change in impedance per degree change in temperature is referred to as the temperature coefficient. The 3-terminal capacitor and the 3-terminal resistor constitute a standard capacitor and resistor value respectively. Normally, the temperature coefficients of the standard capacitor and resistor are much less than the temperature coefficient of the sensor. For greatest accuracy, the standards may be kept at constant temperature or else corrections may be made for the change in temperature of the standards. Normally, however, such precautions are unnecessary; the difference in temperature coefficients is such that variations of 10° C. in the temperature of the standards often results in an error of not more than about 0.01° C. in the temperature measurement. One embodiment of a standard capacitor is illustrated in my U.S. Pat. No. 3,727,117 and is fully discussed therein and is also illustrated in my U.S. Pat. No. 3,759,104 and is discussed at column 6, line 58 to column 7, line 41 thereof. The standards are of sufficient quality that, without introducing appreciable error, they can be considered to be a pure capacitor and a pure resistor, respectively. At the low frequencies at which the bridge normally operates, this criterion is readily fulfilled.

The thermometer also includes a source, $S_v$, of voltage with amplitude, $V_s$, of fixed and known frequency, which may have sinusoidal, triangular, square or other convenient wave form, a detector of voltage, $M_v$, which measures the real part or the imaginary part or the absolute value of the ratio of the amplitude of the output voltage relative to the amplitude of the voltage of said source, $V_o/V_s$. As is well known to those skilled in the art, the absolute value is equal to the square root of the sum of the squares of the real and imaginary parts. The detector reading, which is a function of the temperature of the sensor and the values of the standard capacitor and resistor, may be converted into temperature with the aid of graphs or tables. However, it is usually more convenient to convert the measurement effected by the detector into temperature by means of simple and economic computational circuitry, CC, and display the results in a digital or analog display, D.

As previously noted, greater reliability can often be achieved with the aid of two meters to measure, say, both the real and imaginary parts which are then both converted to temperature. A disagreement between the two temperature values would indicate a malfunction in the bridge or in the computational circuitry.

Figure 1B:
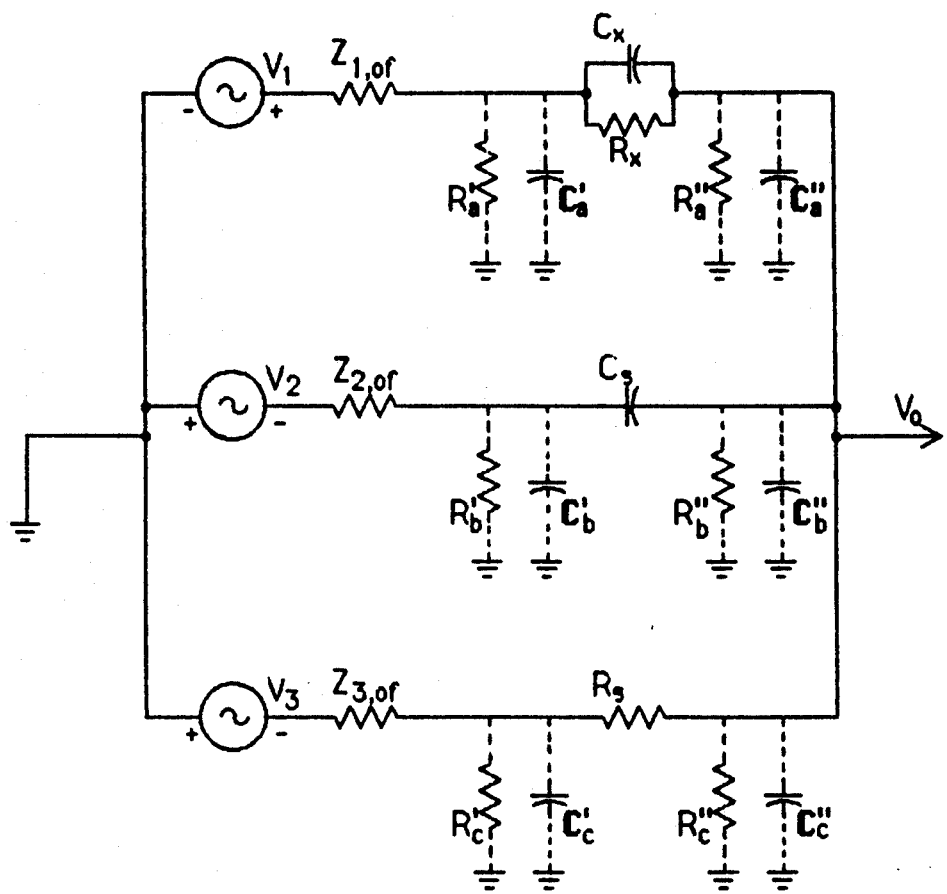
FIG. 1B illustrates the equivalent circuit of the OAR bridge illustrated in FIG. 1A.

FIG. 1B, shows the equivalent circuit of FIG. 1A, excluding the display and detecting and computational circuitry wherein the operational amplifiers $A_1$, $A_2$ and $A_3$ are replaced by voltage generators $V_1$, $V_2$ and $V_3$ with output impedances after feedback, $Z_{1of}$, $Z_{2of}$ and $Z_{3of}$ respectively. In the case of ideal operational amplifiers, the open loop gains:

$$G_1 = G_2 = G_3 = \infty \tag{1}$$

the feedback output impedances, $$Z_{1of} = Z_{2of} = Z_{3of} = 0 \tag{2}$$

and the output voltages, $$V_1 = V_s;\ V_2 = -(R_2'/R_2)V_1;\ V_3 = -(R_3'/R_3)V_1 \tag{3}$$

Figure 1C:
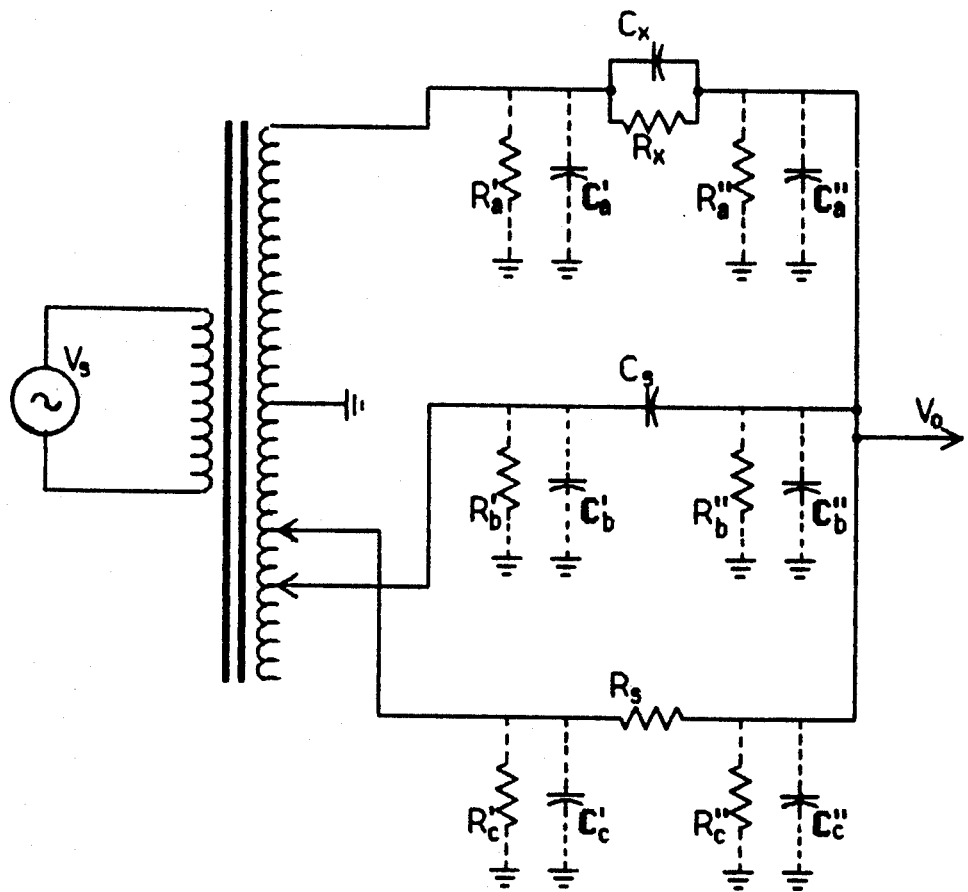
FIG. 1C illustrates a basic transformer bridge which can also be represented by the equivalent circuit illustrated in FIG. 1B.

FIG. 1B, can also be considered to be the equivalent circuit of the transformer bridge shown in FIG. 1C. In the ideal case of perfect coupling and windings of zero resistance, the output impedances are zero in analogy with equation (2) and the output voltages are given by:

$$V_2 = -(n_2/n_1)V_1;\ V_3 = -(n_3/n_1)V_1 \tag{4}$$

where $n_1$, $n_2$, and $n_3$ are the number of turns in the secondary from the center tap to the taps to which the sensor and the reference capacitor(s) and resistor(s) are attached.

Balance of the bridge shown in FIG. 1A is achieved by adjusting the values of the references, $C_s$ and $R_s$, and/or the values of the ratios, $R_2'/R_2\ R_3'/R_3$. Ideally, balance is achieved when $$C_x = +(R_2'/R_2)C_s;\ G_x = +(R_3'/R_3)G_s \tag{5}$$

where $G_x = R_x^{-1}$ and $G_s = R_s^{-1}$. Balance of a transformer bridge is achieved in a similar manner by adjusting the values of $C_s$ and $R_s$ and/or the ratios, $n_2/n_1$ and $n_3/n_1$. The above discussion shows that the operational amplifier ratio (OAR) bridge and the transformer bridge are based on the same principles and therefore can be considered to be analogous.

In real applications, the stray capacitances, $C_a'$, $C_a''$, $C_b'$, $C_b''$, $C_c'$, and $C_c''$, and resistances $R_a'$, $R_a''$, $R_a'$, $R_b''$, $R_b''$, $R_c'$ and $R_c''$, between the electric shield and the electrodes and their leads have negligible effects upon the conditions for balance provided that the magnitudes of the output impedances $Z_{1of}$, $Z_{2of}$ and $Z_{3of}$ of are sufficiently small relative to the magnitude of the stray impedances. Typically, "sufficiently small" means that the magnitude of the feedback output impedance is about $10^{-4}$ of the magnitude of the corresponding stray impedance; although in certain applications this criterion can be relaxed; in others, a somewhat smaller ratio is necessary. To be more specific, the acceptable ratio depends upon the temperature coefficient of the sensor and upon the desired precision and accuracy of the temperature measurement.

Similarly, the magnitude of the output impedances $Z_{1of}$, $Z_{2of}$, and $Z_{3of}$ should be sufficiently small relative to the magnitude of the direct impedances of the sensor and of the standard capacitor and resistor so that the operational amplifiers, $A_1$, $A_2$ and $A_3$, can be considered to be ideal voltage generators; that is, without introducing appreciable error, the output voltages of $A_1$, $A_2$ and $A_3$ can be considered to be independent of the magnitude of the direct impedances of the sensor and of the standards as well as the magnitude of the associated stray impedances.

From equation (5), it is evident that $C_s$ can be much larger than $C_x$; and $R_s$ much smaller than $R_x$. For example, $C_x = 10$ pF while $C_s = 10$ nF; $R_x = 10$ M$\Omega$ while $R_s = 10$ k$\Omega$. In such cases, $C_s$ and $R_s$ can be 2-terminal components since the stray impedances between their first and second electrodes are normally negligibly small compared to their direct impedances.

Figure 2:
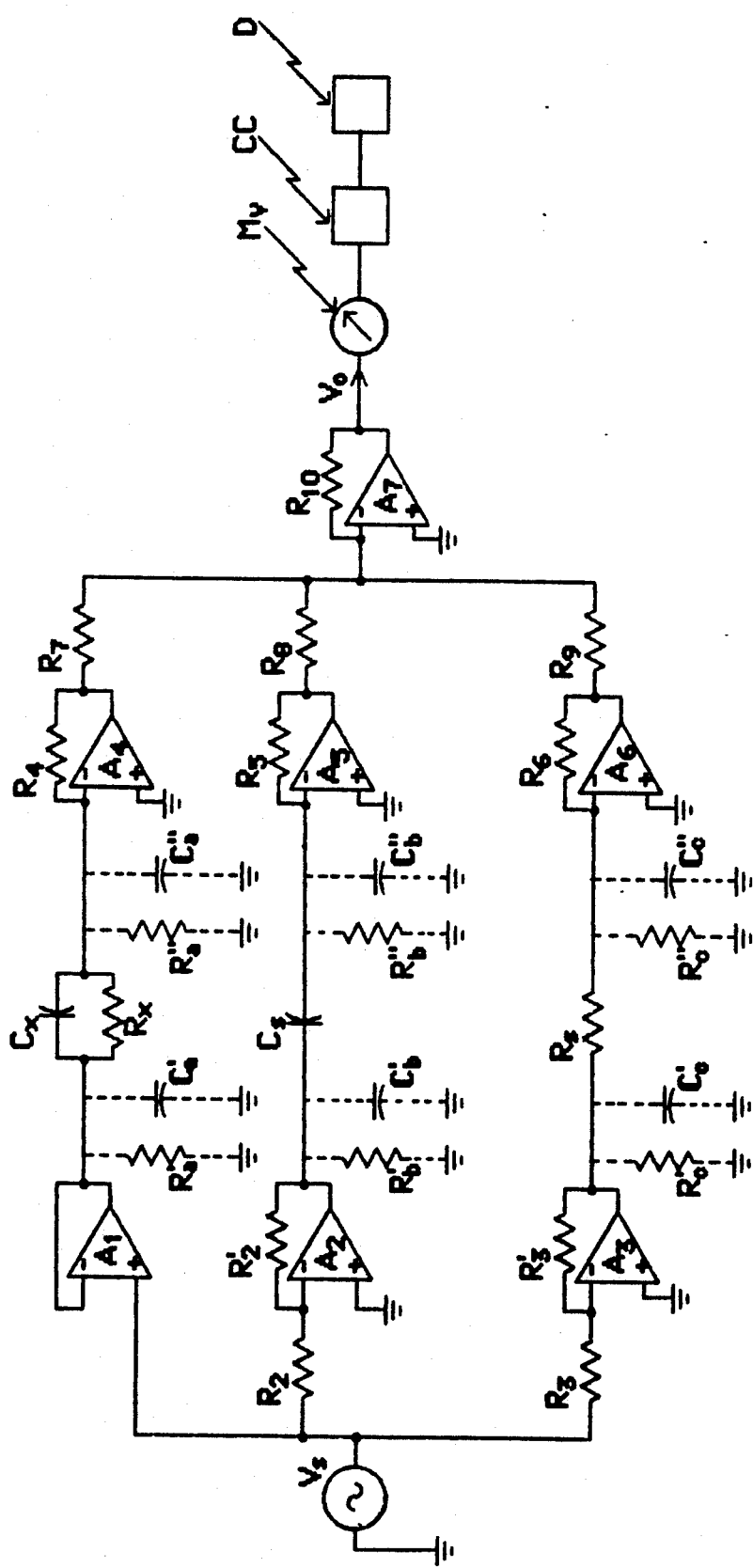
FIG. 2 is a further embodiment of a 3THI thermometer with an OAR bridge which is more versatile and practical than the OAR bridge illustrated in FIG. 1A.

The embodiment of a 3THI thermometer shown in FIG. 2 is identical to the embodiment shown in FIG. 1 except that, in the FIG. 2 embodiment, operational amplifiers $A_4$, $A_5$ and $A_6$ are included in the first, second and third arms respectively. Operational amplifier $A_4$ has a feedback resistor $R_4$, operational amplifier $A_5$ has a feedback resistor $R_5$ and operational amplifier $A_6$ has a feedback resistor $R_6$. Resistors $R_7$, $R_8$ and $R_9$ are connected to the outputs of operational amplifiers $A_4$, $A_5$ and $A_6$ respectively. The common points of $R_7$, $R_8$ and $R_9$ are connected to operational amplifier $A_7$ which has a feedback resistor $R_{10}$.

This particular combination of operational amplifiers, $A_4$, $A_5$ and $A_6$, connected respectively to the resistors, $R_7$, $R_8$ and $R_9$, and operational amplifier $A_7$, with feedback resistor, $R_{10}$, constitutes a summing network well known to those skilled in the art. The output signal from $A_7$ is connected to the detector, $M_v$, which is preferably connected in turn to the computational circuitry, CC, and the display, D. As mentioned previously, it is often convenient to use two detectors, say $M_v'$ and $M_v''$ in parallel, to measure both the real and imaginary parts of the ratio of the amplitude of the output voltage relative to the amplitude of the voltage of source, $V_oV_s$.

In the illustration of this more versatile version of the OAR bridge, and for the sake of simplicity of exposition, the shielding of the leads, components and amplifiers are not shown. Also omitted are such details as, for example, small capacitances in parallel with $R_4$ and $R_5$ which may be necessary to prevent oscillations in the amplifiers $A_4$ and $A_5$. In addition, $C_s$, $R_s$, and other components used for balancing the bridge may represent banks of capacitors and resistors which may or may not be variable.

As in FIG. 1A, $C_a'$, $C_a''$, $C_b'$, $C_b''$, $C_c'$, and $C_c''$ represent the stray capacitances, and $R_a'$, $R_a''$, $R_b'$, $R_b''$, $R_c'$, and $R_c''$, the stray resistances of the electrodes and their leads. The parallel combination, $R_x \parallel C_x'$ represents the equivalent circuit of the sensor whose impedance varies by, say, 1% per degree Celsius relative to the resistance and capacitance standards, $C_s$ and $R_s$. The standards should be 3-terminal components when $R_s$ is large and $C_s$ small; otherwise they may be 2-terminal.

In a properly designed bridge, the magnitude of the output impedances, $Z_{1of}$, $Z_{2of}$ and $Z_{3of}$, of the operational amplifiers $A_1$, $A_2$ and $A_3$, respectively, plus the resistances of the leads are smaller than the corresponding stray impedances by a factor of, say, about $10^4$. As well, the magnitudes of $Z_{1of}$, $Z_{2of}$ and $Z_{3of}$ are respectively smaller than the magnitudes of the direct impedances of the sensor, the standard capacitor, addition, the input impedances after feedback of the operational amplifiers, $A_4$, $A_5$ and $A_6$, which are approximately equal to $R_4/G_4$, $R_5/G_5$ and $R_6/G_6$, are smaller than the stray input impedances by an approximately equal factor. Finally, the magnitude of the impedance of the sensor is greater than the resistance of the leads also by a factor of about $10^4$. For a sensor with an impedance of 1 M Ω, this last criterion is fulfilled for typical shielded coaxial cable, 1 kilometer in length.

The factor of $10^4$ is used to illustrate a typical case of a 3THI sensor with a temperature coefficient of 1% per °C. designed to have a precision of about 0.01° C., unaffected by the resistances of the leads and the stray impedances of the components and their leads. Since it is seldom necessary to measure the temperature with such precision, the criteria of the preceding paragraph can be relaxed by one or two orders of magnitude. Nevertheless, the fulfilling of these conditions is often sufficiently simple, that their relaxation may not result in any significant advantage.

In order to clarify further the criteria by means of a more definite example, reference is made to the first arm in FIG. 2. To simplify calculations, it is assumed that the bridge operates at a frequency of 159.2 Hz, that is, $\omega = 1000$. At this frequency, the gains of the operational amplifiers, $A_1$ and $A_4$, are, say, $10^4$, and $Z_{1of} = 0.1\Omega$. It is assumed that the sensor is a 3-terminal resistor with a resistance of 100 M and a temperature coefficient of 1% per ° C. The sensor is connected to $A_1$ and $A_4$ by coaxial cables, 1 meter in length. The resistances of these cables are typically about 0.05Ω and the capacitances between the central conductor and the shield, $C_a'$, $=C_a'' = 100$ pF, so that the magnitude of the stray reactances, $1/(\omega C_a') = 1/(\omega C_a'') = 100$ M Ω, approximately. Without feedback, the input impedance of $A_4$ is assumed to be $10^{12}$ Ω in parallel with 5 pF. If the feedback resistor $R_4 = 100$ MΩ, then the input resistance after feedback equals 10 kΩ.

As can be readily calculated, all the above stated criteria are met in this typical example. If the lengths of the cables are increased to 1 kilometer, then the criteria are still met if the frequency is reduced by a factor of 100 and the gain of $A_4$ is increased by a factor of 10.

Similarly, the magnitudes of the output impedances, $Z_{4of}$, $Z_{5of}$ and $Z_{6of}$, of the operational amplifiers, $A_4$, $A_5$ and $A_6$, respectively, should be negligibly small compared to the stray impedances at the outputs of these operational amplifiers and compared to the resistances, $R_7$, $R_8$ and $R_9$. These criteria are normally met in typical summing circuits.

If the above conditions are fulfilled, and if, for simplicity, we let $R_2 = R_2' = R_3 = R_3'$ and $R_7 = R_8 = R_9$, then, $$V_o = \left[ \left( \frac{R_6}{R_s} - \frac{R_4}{R_x} \right) + j\omega(C_s R_5 - C_x R_4) \right] \frac{R_{10}}{R_7} V_s \quad (6)$$

so that $$C_x = \frac{R_5 C_s}{R_4} - \frac{R_7}{\omega R_4 R_{10}} Im\left(\frac{V_o}{V_s}\right) \quad (7)$$

and $$G_x = R_x^{-1} = \frac{R_6}{R_s R_4} - \frac{R_7}{R_4 R_{10}} Im\left(\frac{V_o}{V_s}\right) \quad (8)$$

approximations but, under favorable conditions, are accurate to 0.01% or better. Under more general conditions, a correction factor in equations (6), (7) and (8) still permits the calculation of $C_x$ and $G_x$ to an accuracy of 0.01% or better. The nature of this correction factor is discussed below.

As indicated in equations (7) and (8), the operational amplifiers, $A_4$, $A_5$ and $A_6$, and their corresponding feedback resistors $R_4$, $R_5$ and $R_6$, can be considered to change the effective values of $C_s$ and $R_s$. For example, by increasing the ratio $R_5/R_4$ by a factor of 10 the effective value of $C_s$ is increased by the same factor. The effective values of $C_s$ and $G_s$ ($=R_s-1$) can also be changed by varying the ratios $R_7/R_8$ and $R_7/R_9$. Consequently, it is possible to reduce the number of resistance and capacitance standards needed to balance or partially balance the bridge. In this respect, it should be noted that it is simpler and more economical to construct and maintain two resistors with a highly stable resistance ratio than to construct and maintain a standard capacitor or resistor.

By changing the ratios of pairs of resistors such as $R_6/R_4$, $R_3'/R_3$ or $R_8/R_7$, the bridge can be partially balanced to determine, say, the two most significant Figures in $R_x$ and/or $C_x$; and then th complex quantity, $V_o/V_s$, can be measured to determine the following two or three less significant figures. It is important to note that $R_x$ and $C_x$ are measured as functions of the ratio $V_o/V_s$ so that the measurement is, within reasonable limits, almost completely unaffected by the possible drift of the output voltage, $V_s$, of the oscillator which activates the bridge.

There are several modifications of the circuits of FIGS. 1 and 2 which fulfill the same general criteria explained above: one particularly simple version of the embodiment of FIG. 2 is a 1-armed bridge in which the two branches containing the standards $R_s$ and $C_s$ are eliminated. Equations (6), (7) and (8) still apply if it is assumed that $C=0$ and $R_s = \infty$. Thus $R_s$ and $C_s$ are determined solely from the real and imaginary parts of $V_o/V_s$. Although the use of a 1-armed bridge permits a reduction in the size and cost of the bridge, it also can lead to a reduction in the accuracy of the measurement of the impedance of the sensor-which, however, can be compensated for, in certain cases, by using more sensitive sensors. Additional economy in cost and size can, in certain cases, be achieved by replacing the sinusoidal signal source $S_v$ by a square or triangular wave oscillator, and in the case of 3THI resistive sensors, by a D.C. voltage source.

Figure 3:
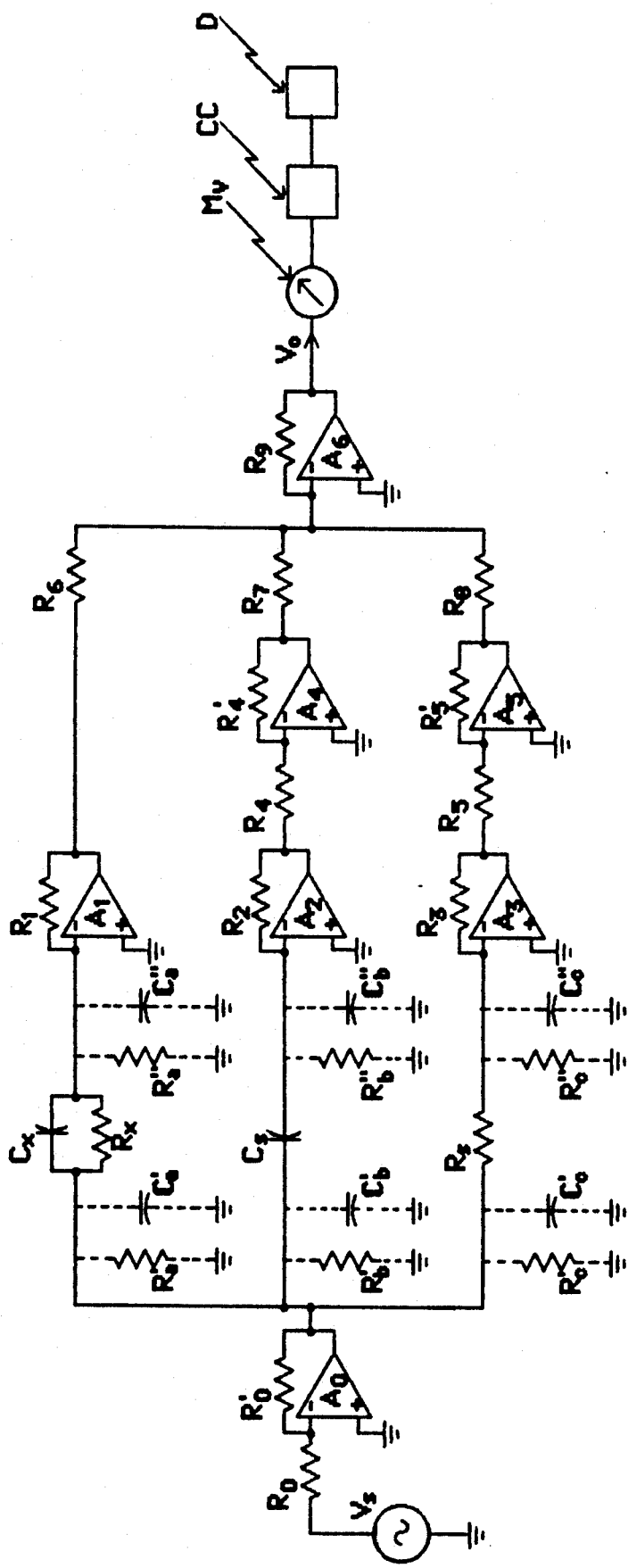
FIG. 3 is a further embodiment of a 3THI thermometer with additional modification of an OAR bridge.

The further embodiment illustrated in FIG. 3 differs from the embodiment of FIG. 2 in that the input of the three arms are proceeded by the common operational amplifier, $A_0$, having a feedback resistor, $R_0'$. In addition, the sensor is followed by one operational amplifier, $A_1$, having a feedback element, $R_1$, while the standard capacitor is followed by the two operational amplifiers, $A_2$ and $A_4$, having feedback resistors, $R_2$ and $R_4'$, respectively; and the standard resistor is followed by the two operational amplifiers, $A_1$ and $A_3$, having feedback resistors, $R_3$ and $R_5'$, respectively. The criteria enunciated in the discussion of the embodiment illustrated in FIG. 2 apply as well to the embodiment shown in FIG. 3.

In the modification of FIG. 3, all of the operational amplifiers are inverting. As will be explained below, the use of only inverting operational amplifiers permits a convenient method for reducing the experimental error.

Still other modifications will be evident to those skilled in the art. For example, variable, previously calibrated, 3-terminal capacitors and/or resistors may be placed in parallel with the sensor in arm 1 in FIGS.

1A, 2 and 3. The bridge is kept in a state of permanent balance by varying the calibrated capacitors and/or resistors so as to compensate for variations in the sensor produced by changes in the temperature.

In yet another modification, a standard resistor preceded by a phase shifter is substituted for the standard capacitor in arm 2 in FIGS. 1A, 2 and 3. If the phase shifter advances the voltage signal by 90° then the standard resistor becomes, in effect, a standard capacitor.

Figure 4A:
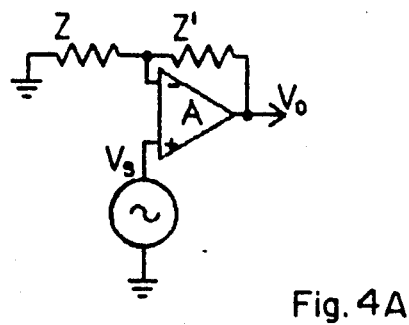
FIG. 4A illustrates the basic non-inverting operational amplifier.
Figure 4B:
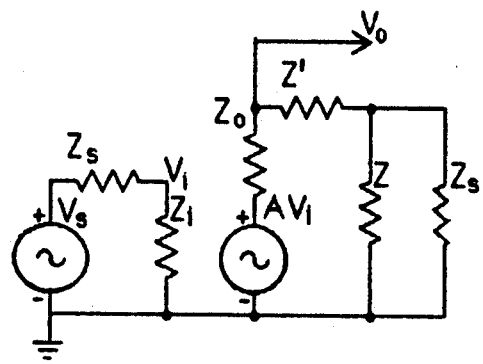
FIG. 4B is the equivalent circuit of FIG. 4A.
Figure 5A:
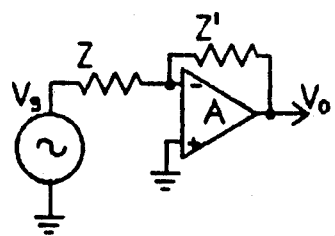
FIG. 5A illustrates the basic inverting operational amplifier.
Figure 5B:
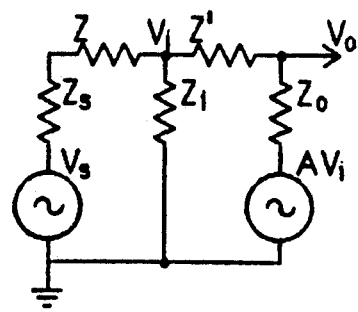
FIG. 5B is the equivalent circuit of the operational amplifier in FIG. 5A.

In order to develop more accurate expressions than the idealized equations (1)–(8) used to explain the basic principles of an OAR bridge, attention is drawn to FIGS. 4A and 4B, which show the basic non-inverting operational amplifier and its equivalent circuit, and to FIGS. 5A and 5B which show the basic inverting operational amplifier and its equivalent circuit. On the basis of the theory of operational amplifiers explained in such text books as Microelectronics by J. Millman and published by McGraww-Hill Co. of N.Y. in 1979, the gain of the operational amplifier of FIG. 4 is $$G_f = \left[\frac{Z + Z'}{Z}\right]\left[\frac{1}{1 + \frac{Z + Z' + Z_o}{GZ}}\right] \quad (9)$$

where G is the open loop gain; $G_f$ the gain with feedback; and $Z_o$ the open loop output impedance of the operational amplifier. In the development of equation (9), it has been assumed that both Z and the output impedance, $Z_s$, of the signal source are negligibly small compared with the input impedance, $Z_i$, before feedback. The bridge of this invention is designed and operated so that these two approximations do not introduce any significant error.

In the continuation of the analysis of the circuits discussed in this patent, it will be assumed that the open loop gain is given by $$G = K/(1 + jf/f_H) \quad (10)$$

where f is the frequency; $f_H$ a constant often referred to as the corner or 3 dB frequency; and K the gain at f=0. Equation (10) represents a good approximation to the open loop gain of many commercially available operational amplifiers.

As noted previously, $G = K = \infty$ for an ideal operational amplifier, in which case equation (9) reduces to $$G_f = \frac{Z + Z'}{Z} \quad (11)$$

For the sake of ease of illustration, it will be assumed that $K = 10^5$ (100 dB); $f_H$ 100 Hz; $Z = Z_o = 1$ kΩ; and $Z' = 99$ kΩ, where all the values are exact. Then at f=1 kHz, $G_f = 100/(1.00101 + .0101j)$ and $|G_f| = 99.894$ according to the realistic approximations given by equations (9) and (10) while $|G_f| = 100$ exactly in the ideal case (equation (11)). Therefore the gain of a real amplifier differs from the ideal value by about 0.1% for the case under discussion. Since the values of G and $Z_o$ are often uncertain by about 25% and sometimes more, the actual gain with feedback is uncertain by about three parts in $10^4$.

If, however, $Z' = 9$ kΩ and f = 100 Hz, then according to equation (9), $G_f = 10/(1.00011 + 0.00011j)$ and $|G_f| = 9.9989$, which differs from the ideal value by about one part in $10^4$. Furthermore, the uncertainty in the gain is reduced to about three parts in $10^5$.

The output admittance with feedback is given by $$Y_{of} = \frac{1}{Z + Z'} + \left(1 + \frac{GZ}{Z + Z'}\right)Y_o \quad (12)$$

according to the equivalent circuit of FIG. 4A. Normally, equation (12) can be simplified, with negligible error, to $$Z_{of} = \left(\frac{Z + Z'}{Z' + (G + 1)Z}\right)Z_o \quad (13)$$

With the same values that were used above to calculate $G_f$, equation (13) gives $|Z_{of}| = 10\Omega$ for $Z' = 99$ kΩ, f = 1 kHz, and $|Z_{of}| = 0.1\Omega$ for $Z' = 9$ kΩ, f = 10 Hz. This second value for $|Z_{of}|$ compares well with the output impedance of high quality transformer bridges.

Turning now to the inverting operational amplifier shown in FIGS. 5 and 5A, it can be shown that $$G_f = -\left[\frac{Z'}{Z}\right]\left[\frac{1 - Z_o/(GZ')}{1 + \frac{Z + Z' + Z_o}{GZ}}\right] \quad (14)$$

and $$Z_{of} = \frac{Z + Z'}{Z' + (G + 1)Z} \quad (15)$$

where the same approximations were used as in the deduction of equations (9) and (13). In the ideal case, $G = \infty$, and $$G_f = -\frac{Z'}{Z} \quad (16)$$

If the same values are substituted in equations (14) and 15) as were used in the discussion of the non-inverting amplifier, then nearly the same deviations from the ideal values for $G_f$ and $Z_{of}$ are found as in the previous case.

Much greater precision in the calculation of $G_f$ and much lower values of $Z_{of}$ are obtained if the operational amplifier is formed by combining operational amplifiers such as those shown in FIGS. 4 and 5. The open loop gain of such an amplifier can be stabilized and calculated to 2% or better as it is the product of the feedback stabilized gain of its operational amplifier components. The open loop output impedance is normally about 10Ω or less as it is reduced by the feedback loop in its output stage. The effect of an additional feedback loop from the output to the input of the amplifier is the stabilization of the gain to better than one part in $10^4$ and the reduction of the output impedance to the point where it can be considered to be almost zero from the practical point of view. Moreover the gain can be calculated to better than one part in $10^4$, the accuracy of the calculation being essentially limited by the precision of the components used in the feedback loops. Such a circuit will be referred to in this document as an operational amplifier with nested feedback stabilization.

Figure 6:
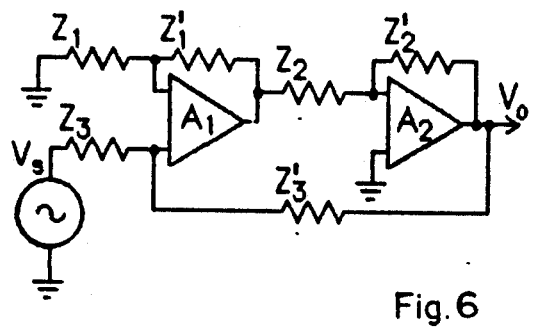
FIG. 6 is a possible realization of an inverting operational amplifier with nested feedback stabilization.

One possible realization of an inverting operational amplifier with nested feedback stabilization is shown in FIG. 6. The open loop gain at zero frequency is $$G = -\left[\frac{Z_1' + Z_1}{Z_1}\right]\left[\frac{Z_2'}{Z_2}\right] \quad (17)$$

to within better than 2% if $A_1$ and $A_2$ are standard FET input operational amplifiers. The main disadvantage of this circuit is that it is a 2-pole amplifier and may thus reveal a resonance at a particular frequency. In fact, the circuit may actually oscillate because of the effect of high frequency poles whose presence can usually be ignored in the analysis of nominally 1-pole amplifiers. As is well known to those skilled in the art, this disadvantage can be readily overcome by compensating the circuit; that is, by separating the poles and/or by adding a zero in such a manner that the resonance disappears. A detailed discussion of methods of compensation can be found in the previously mentioned textbook microelectronics by J. Millman.

On the basis of the preceding analysis, it is believed that it would be difficult to construct an OAR bridge with a precision exceeding 0.01% without resorting to expensive standards and control of the temperature of the bridge components. On the other hand, the voltage ratios of a carefully wound transformer are stable to one part per million or better and almost immune to moderate temperature fluctuations and to aging. In certain cases, it is advantageous to use a tapped transformer to determine the first and second most significant digits and an OAR bridge to determine the following three or four less significant digits of the impedance of a 3THI temperature sensor. Such a hybrid transformer-operational amplifier ratio bridge is referred to here as a TOAR bridge.

Figure 7:
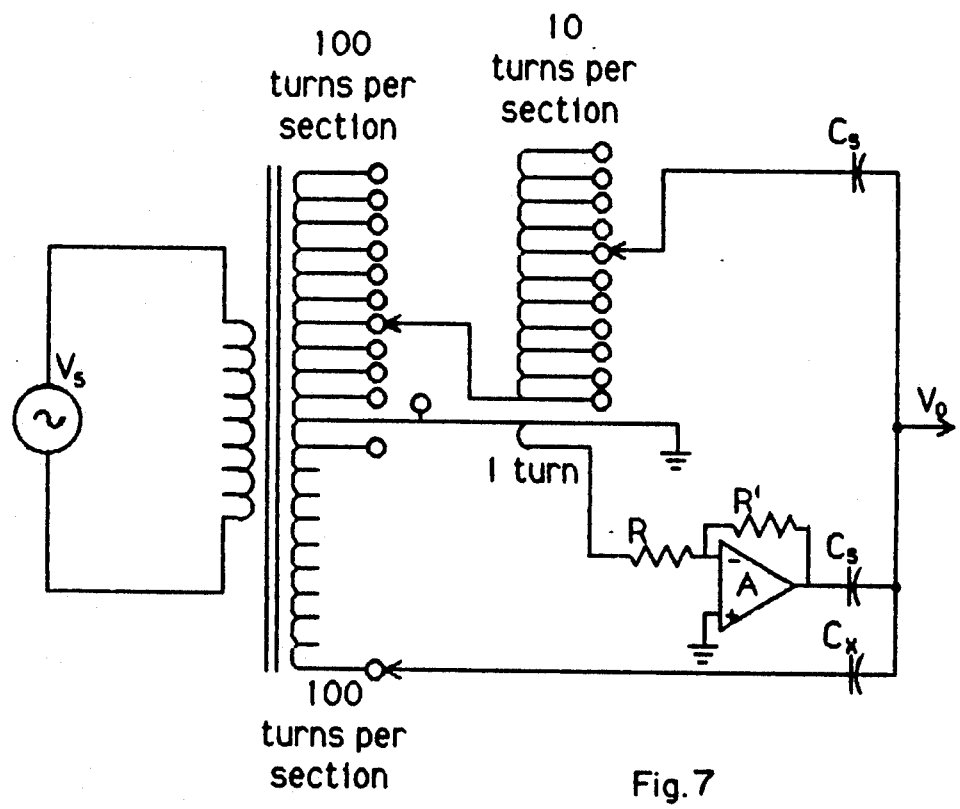
FIG. 7 illustrates the basic elements of a simple TOAR bridge.

The basic elements of a simple TOAR bridge are shown in FIG. 7. If, for example, the bridge is balanced with the transformer set as shown in the diagram and with $R'/R = 3.90...$, then $C_x = 0.47390...C_s$, where the number of significant figures depends upon the characteristics of the operational amplifier, the stability of the two nominally identical standard capacitors, and the sensitivity of the bridge detector. As will be evident to those skilled in the art, slight modifications of the bridge shown in FIG. 7 enable the measurement of resistances and a capacitor and resistor in parallel. Other hybrid combinations of inductively coupled ratio arms and OAR bridges will be evident to those skilled in the art.

TOAR bridges permit the use of 3THI temperature sensors with dielectrics composed of common ionic crystals such as MaO and NaCl. Such sensors have negligible dissipation and are reasonably linear over a temperature range of more than 300° C. but have temperature coefficients of only a few hundred parts per million per ° C. A 3THI thermometer consisting of such a sensor with a TOAR bridge to measure its impedance provides a convenient and economical method of measuring the temperature with a precision of 0.1° C. or better.

Figure 8:
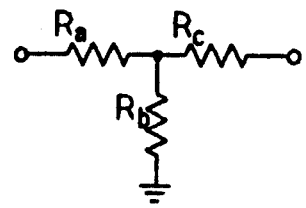
FIG. 8 is a T configuration of resistors with relatively small resistances that permits the replacement of those standard and/or feedback resistors with very large resistances in the OAR bridges in FIGS. 1, 2 and 3 in the TOAR bridge in FIG. 7.

The measurement of 3THI temperature sensors using OAR or TOAR bridges is facilitated when certain of the resistors such as $R_4$ in FIGS. 2 have resistances approximately equal to the magnitude of the impedance of the sensor. In many applications, this criterion would entail resistors with resistances of 100 M$\Omega$ or more with an accuracy of 0.01% or better and with temperature coefficients of, say, ten parts per million or less. It is believed that, with available technology, it is uneconomic to utilize such components and barely feasible to construct them. However, it is possible to use combinations of commercially available and economic metal film and wire wound resistors having the desired temperature coefficient and precision and whose effective resistance in the bridge is equal to, or greater than, 100 M$\Omega$. The T configuration shown in FIG. 8 is one such combination. If it is substituted for $R_4$ in FIG. 2 or $R_1$ in FIG. 3, then the effective resistance $$R_{ef} = \frac{(R_a + R_b)R_c}{R_b} + R_a \quad (18)$$

for an ideal operational amplifier with infinite open loop gain. For a real operational amplifier, small correction factors may be necessary for optimum accuracy.

If, for example, $R_a = 99.9$ k$\Omega$, $R_b = 100\Omega$, $R_c = 99.9$ k$\Omega$, all values being considered exact, then $R_{ef} = 100$ M$\Omega$ to within two parts per million in the ideal case. By repeating the T configuration, even higher effective resistances can be obtained.

Having broadly described the present invention, modifications will be evident to those skilled in the art without departing from the spirit of the invention as defined in the appended claims.

I claim:

1. A thermometer comprising:
    an operational amplifier ratio bridge including:
    at least one arm, said arm including:
    a high impedance 3-terminal impedor including a first and second electrode, each electrode having leads, said leads being electrically shielded from each other, a temperature sensitive material interposed between said first and second electrodes, a third shielding electrode having a lead, said third electrode being insulated from said first and second electrodes and said third electrode surrounding and shielding said first and second electrodes and the interposed material for fixing the direct impedance between said first and second electrodes so that said direct impedance varies with the temperature as a well defined function thereof, the magnitude of said direct impedance being sufficiently great that the resistance of said leads can be considered to be negligibly small, said 3-terminal impedor comprising the sensing element of said thermometer;
    a first inverting operational amplifier whose gain has been accurately determined and stabilized by negative feedback and whose output is connected to said lead of said first electrode of said 3-terminal impedor, the output impedance of said first operational amplifier being reduced by said negative feedback so as to be negligibly small compared to the magnitude of said direct impedance of said 3-terminal impedor and compared to the magnitude of the stray impedance of said first electrode and said lead;
    a voltage source providing a voltage of known and stable frequency to the input of said first operational amplifier, said frequency being sufficiently low that the resistance of said leads becomes negligibly small compared with the magnitude of the stray capacitive reactance associated therewith;

a detecting operational amplifier whose gain has been accurately determined and stabilized by negative feedback and whose inverting input is connected to said lead of said second electrode of said 3-terminal impedor, the input impedance of said detecting operational amplifier being reduced by said negative feedback so as to be negligibly small compared to the magnitude of said 3-terminal impedor and compared to the magnitude of the stray impedance of said second electrode and said lead;

a meter for measuring the real part or the imaginary part or the absolute value of the ratio of the amplitude of the output voltage of said detecting operational amplifier to the amplitude of the output of said voltage source, the input impedance of said meter being sufficiently large so that the output impedance after feedback of said detecting operational amplifier does not introduce significant error in the measurement;

wherein, the temperature which determines the direct impedance of said 3-terminal impedor is calculated from the measured value.

2. A thermometer as defined in claim 1 wherein said operational amplifier ratio bridge includes two meters for measuring the real part and the imaginary part of the ratio of the amplitude of the output voltage of said detecting operational amplifier to the amplitude of the output of said voltage source, the input impedance of said meters being sufficiently large so that the output impedance after feedback of said detecting operational amplifier does not introduce significant error in the measurement;

wherein, the temperature is calculated from both the real part and the imaginary part of the ratio and the two calculated values compared so as to detect possible malfunctions in the operational amplifier ratio bridge or error in the calculation of the temperature.

3. A thermometer as defined in claim 2 wherein said operational amplifier ratio bridge further comprises a second arm and a third arm;

said second arm comprising standard capacitor means having a first electrode means and a second electrode means and a second operational amplifier whose output is connected to the first electrode means of said standard capacitor means;

said third arm comprising standard resistor means having a first electrode means and a second electrode means; and a third operational amplifier whose output is connected to the first electrode means of said standard resistor means;

the gains of said second and third operational amplifiers being accurately determined and stabilized by negative feedback and the output impedances of said second and third operational amplifiers being made negligibly small by said negative feedback;

the inputs of said first, second and third operational amplifiers being connected together and to the output of said voltage source;

the output voltage of said second and third operational amplifiers being opposite in phase with respect to the output voltage of said first operational amplifier;

the lead of the second electrode of said 3-terminal sensing impedor and the leads of at least one of the second electrodes of said standard resistor means and of at least one of the second electrodes of said standard capacitor means being connected together and to the input of said detecting operational amplifier;

said operational amplifier ratio bridge being balanced by adjusting the gains of said first, second, and third operational amplifiers or the effective values of said standard resistor means and of said standard capacitor means;

wherein, the temperature which determines the direct impedance of said 3-terminal impedor is calculated from the measured value of said parts of said ratio of said amplitudes and from the gains of said first, second, and third operational amplifiers and from the effective capacitance of said standard capacitor means and of the effective resistance of said standard resistor means.

4. A thermometer as defined in claim 3 wherein the detecting amplifier is a non-inverting operational amplifier.

5. A thermometer as defined in claim 3 and further including:

a fourth operational amplifier interposed between said 3-terminal impedor and said detecting operational amplifier, the gain of said fourth operational amplifier being accurately determined and stabilized by negative feedback and the input and output impedances of said fourth operational amplifier being made negligibly by said negative feedback, first precision resistor means having first electrode means and second electrode means, the output of said fourth operational amplifier being connected to said first electrode means of said first precision resistor means, the second electrode means of said first precision resistor means being connected to an inverting input of said detecting operational amplifier;

a fifth operational amplifier interposed between said standard capacitor means and said detecting operational amplifier, the gain of said fifth operational amplifier being accurately determined and stabilized by negative feedback and the input and output impedances of said fifth operational amplifier being made negligibly small of said negative feedback, the output of said fifth operational amplifier being connected to first electrode means of second precision resistor means, second electrode means of said second precision resistor means being connected to the inverting input of said detecting operational amplifier;

a sixth operational amplifier interposed between said standard resistor means and said detecting operational amplifier, the gain of said sixth operational amplifier, being accurately determined and stabilized by negative feedback and the input and output impedances of said sixth operational amplifier being made negligibly small of said negative feedback, the output of said sixth operational amplifier being connected to first electrode means of a third precision resistor means, second electrode means of said third precision resistor means being connected to the inverting input of said detecting operational amplifier;

the fourth, fifth, sixth, and detecting operational operator amplifiers together with the first, second and third precision resistor means, and a feedback resistor of said detecting operational amplifier forming a summing circuit;

said operational amplifier ratio bridge being approximately or accurately balanced by adjusting the relative gains of said first, second, third, fourth, fifth and sixth operational amplifiers or the effective values of said standard resistor means and of said standard capacitor means or the relative effective values of said first, second and third precision resistor means;

wherein, the temperature which determines the direct impedance of said 3-terminal impedor is calculated from the measured value and from the gains of said first, second, third, fourth, fifth and sixth operational amplifiers and from the effective values of the standard capacitor means connected to said second operational amplifier and of the standard resistor means connected to said third operational amplifier and the relative values of said first, second and third precision resistor means.

6. A thermometer as defined in claim 3 wherein a second inverting operational amplifier is interposed between said 3-terminal impedor and said detecting operational amplifier and wherein said operational amplifier ratio bridge further comprises a second arm and a third arm;

the gain of said second inverting operational amplifier being accurately determined and stabilized by negative feedback and the input and output impedances of said second inverting operational amplifier being made negligibly small by said negative feedback, the output of said second inverting operational amplifier being connected to first precision resistor means having first electrode means and second electrode means, the output of said second inverting operational amplifier being connected to said first electrode means, said second electrode means of said first precision resistor means being connected to the inverting input of said detecting operational amplifier;

said second arm comprising standard capacitor means having first electrode means and second electrode means and third and fourth inverting operational amplifiers, the gains of said third and fourth inverting operational amplifiers being accurately determined and stabilized by negative feedback and the input and output impedances of said third and fourth inverting operational amplifiers being made negligibly small of said negative feedback, said first electrode means of said standard capacitor means being connected to the output of said first operational amplifier, said second electrode means of said standard capacitor means being connected to the input of said third inverting operational amplifier, the output of said third inverting operational amplifier being connected to first electrode means of a second precision resistor means also having second electrode means, said second electrode means of said second precision resistor means being connected to the input of said fourth inverting operational amplifier, third precision resistor means, having first electrode means connected to the output of said fourth inverting operational amplifier, and second electrode means being connected to the inverting input of said detecting operational amplifier;

said third arm comprising standard resistor means, having first electrode means and second electrode means, and fifth and sixth inverting operational amplifiers, the gains of said fifth and sixth inverting operational amplifiers being accurately determined and stabilized by negative feedback and the input and output impedances of said fifth and sixth inverting operational amplifiers being made negligibly small by said negative feedback, said first electrode means of said standard resistor means being connected to the output of said first operational amplifier, said second electrode means of said standard resistor means being connected to the input of said fifth inverting operational amplifier, the output of said fifth inverting operational amplifier being connected to first electrode means of a fourth precision resistor means, also having second electrode means, said second electrode means of said fourth precision resistor means being connected to the input of said sixth inverting operational amplifier, first electrode means of a fifth precision resistor means, also having second electrode means, being connected to the output of said fifth inverting operational amplifier, said second electrode means of said fifth precision resistor means being connected to said inverting input of detecting operational amplifier;

the second, fourth, sixth and detecting operational amplifiers together with the first, third, and fifth precision resistor means, and a feedback resistor of said detecting operational amplifier forming a summing circuit;

said operational amplifier being balanced by adjusting the relative gains of said second, third, fourth, fifth and sixth operational amplifiers or the effective values of said standard resistor means and of said standard capacitor means or the relative effective values of said first, second, third, fourth and fifth precision resistor means;

wherein, the temperature which determines the direct impedance of said 3-terminal impedor is calculated from said measured value and from the relative gains of said second, third, fourth, fifth and sixth operational amplifiers and from the effective values of the standard capacitor means and of said standard resistor means connected to said first operational amplifier and the relative effective values of said first, second, third, fourth and firth precision resistor means.

7. A thermometer as defined in claim 6 wherein said operational amplifier ratio bridge is combined with a transformer bridge whereby said transformer bridge is used to measure the more significant figures of the direct impedance of said sensing element and said operational amplifier ratio bridge is used to measure the following less significant figures.

8. A thermometer as defined in claim 7 wherein said operational amplifier ratio bridge or said transformer bridge contains combinations of highly stable and precision resistors acting as reference standards or as feedback resistors whose effective resistance in the circuit is approximately equal to, or greater than, 10 times the resistance of any one of the component resistors of said combinations.

9. A thermometer as defined in claim 8 wherein nested feedback is used to increase further the accuracy and stability of the gain of said operational amplifiers and to reduce further to output impedances of said operational amplifiers.

10. A thermometer as defined in claim 9 wherein said first arm of said operational amplifier ratio bridge comprises combinations of further standard resistor means or standard capacitor means in addition to said 3-terminal sensing impedor and wherein balance is approximately or accurately achieved by varying the effective values of said further standard resistor means or further capacitor means.

11. A thermometer as defined in claim 10 wherein said second arm of said operational amplifier ratio bridge comprises a 90° phase shifter connected to a still further standard resistor means, said phase shifter and said further standard resistor means stimulating and replacing said further standard capacitor means.

* * * * *